United States Patent [19]
Muster et al.

[11] 3,919,888
[45] Nov. 18, 1975

[54] GAUGE

[75] Inventors: Hans Ulrich Muster, Mulchi; Peter Kipfer, Jegenstorf; Peter Aebi, Burgdorf; Hans Zwahlen, Hindelbank, all of Switzerland

[73] Assignee: Haenni & Cie. Aktiengesellschaft, Bern, Switzerland

[22] Filed: Apr. 9, 1974

[21] Appl. No.: 459,343

[30] Foreign Application Priority Data
Apr. 17, 1973 Switzerland.......................... 5502/73

[52] U.S. Cl. ...................... 73/291; 73/300; 73/412
[51] Int. Cl.² ........................................ G01F 23/14
[58] Field of Search.......... 73/300, 432 R, 299, 291, 73/412, 411, 418, 389, 407 PR

[56] References Cited
UNITED STATES PATENTS

| | | | |
|---|---|---|---|
| 3,312,109 | 4/1967 | Kutzler | 73/407 PR |
| 3,363,460 | 1/1968 | Baumann | 73/412 |
| 3,457,393 | 7/1969 | Stubbs et al. | 73/412 |

*Primary Examiner*—Donald O. Woodiel
*Attorney, Agent, or Firm*—Holman & Stern

[57] ABSTRACT

A gauge, especially for indicating the remaining diving time available to a diver at a given moment based upon his gas supply and his diving depth at that moment. Two measuring elements, e.g. Bourdon tubes, are each fastened at one end separately from one another. The free end of one of these elements is connected to a pointer, whereas the free end of the other element influences the extent of the pointer's rotation caused by the movement of the first element.

4 Claims, 3 Drawing Figures

GAUGE

BACKGROUND OF THE INVENTION

This invention relates to a gauge for determining the value C·(P/Q), in which C stands for a constant, and P and Q each stand for pressures or pressure differentials, comprising a first measuring element exposed to the pressure or pressure differential P and a second measuring element exposed to the pressure or pressure differential Q, said measuring elements each being fastened at one end, with their free ends each being adapted to carry out movements corresponding to the variations of P and Q, respectively which movements are transmitted to a pointer mechanism in a combination such that the turning of the pointer corresponds to the value C·(P/Q).

PRIOR ART

Gauges of this type have already been proposed as such for indicating the remaining diving time available to a diver at a given moment based upon his gas supply and his diving depth at that moment. In these known gauges, the first measuring element is fastened at one end, while the second measuring element is rigidly connected to the free end of the first one. The measuring movement of the free end of the second element must then be made to take place in a direction perpendicular to that of the measuring movement of the first element.

Such gauges have a number of drawbacks. For one thing, the measuring paths of the elements are small, particularly when these elements take the form of Bourdon tubes. Furthermore, for the above-mentioned formula to be adhered to precisely, the distance between the point of application of the second element and the center of rotation of the pointer mechanism must be approximately 1/6 of the already very short measuring movements. The result is that, if only for reasons of manufacturing technique, the respective dimensions can hardly be accurately maintained. Furthermore, the very small lever arm between the point of application and the pointer spindle does not ensure faultless operation of the pointer. In addition, the rigid connection of the two elements is very sensitive to shocks. Finally, deviations in tolerance of the two elements due to materials and manufacturing conditions can be eliminated only be means of a very costly and time-consuming adjustment.

OBJECT AND SUMMARY OF THE INVENTION

It is the object of the present invention to provide a gauge of the aforementioned type which avoids the above drawbacks and which offers the possibility, above all as regards production procedures, of obtaining a precisely accurate indication regardless of tolerance limitations in manufacture.

To this end, the two measuring elements in the gauge according to the present invention are each fastened at one end separately from one another, and the free end of the one measuring element is connected to the pointer mechanism via a lever mechanism comprising a control lever, with a swivelling of the control lever corresponding to a certain movement of the free end of the one measuring element being influenced in its magnitude by the other measuring element.

BRIEF DESCRIPTION OF THE DRAWINGS

Two preferred embodiments will now be described, by way of example, with reference to the accompanying drawings, in which.

DETAILED DESCRIPTION OF THE EMBODIMENTS

Figure 1:
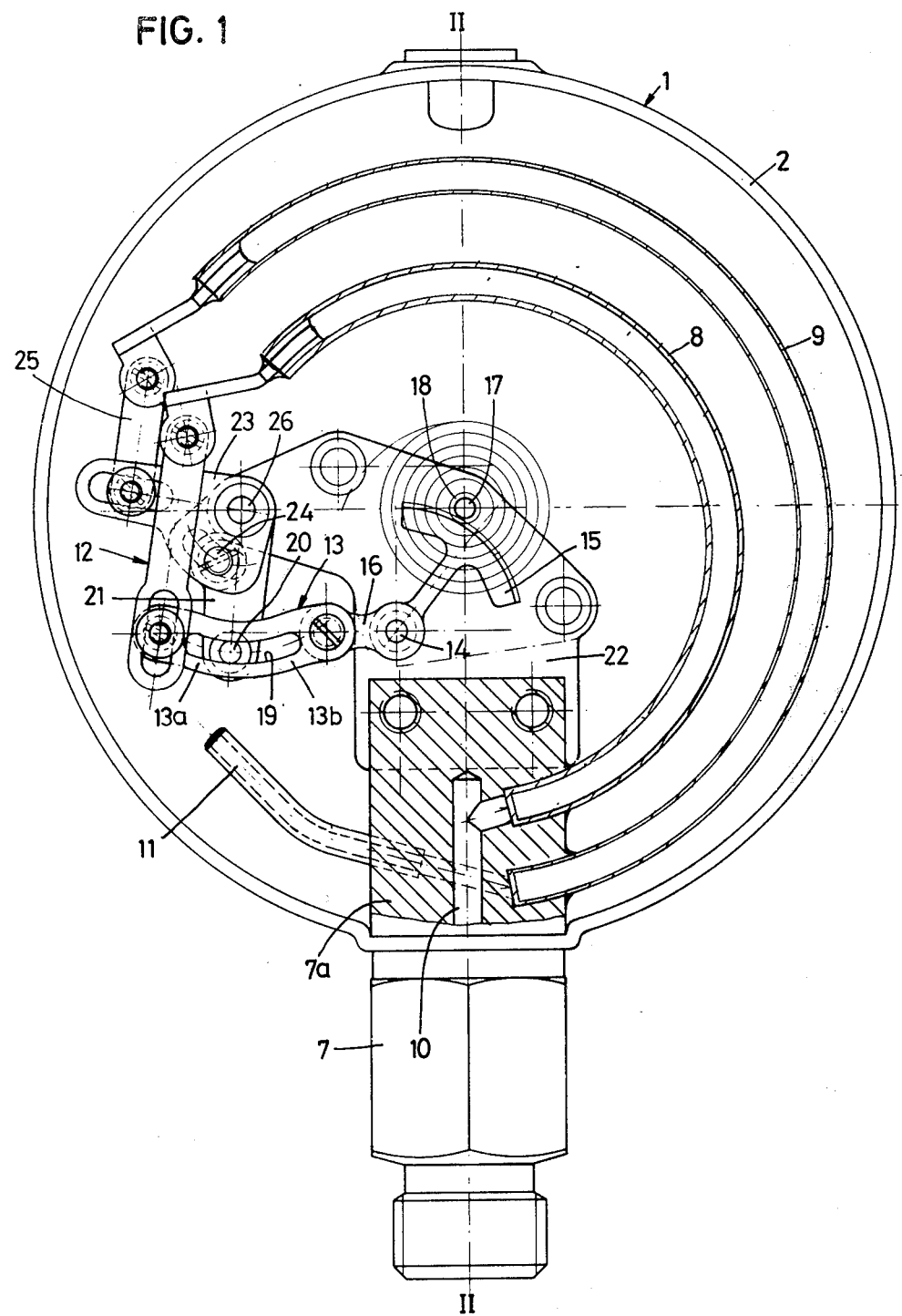
FIG. 1 is an elevation of a first embodiment, with the window shield and the dial removed.
Figure 2:
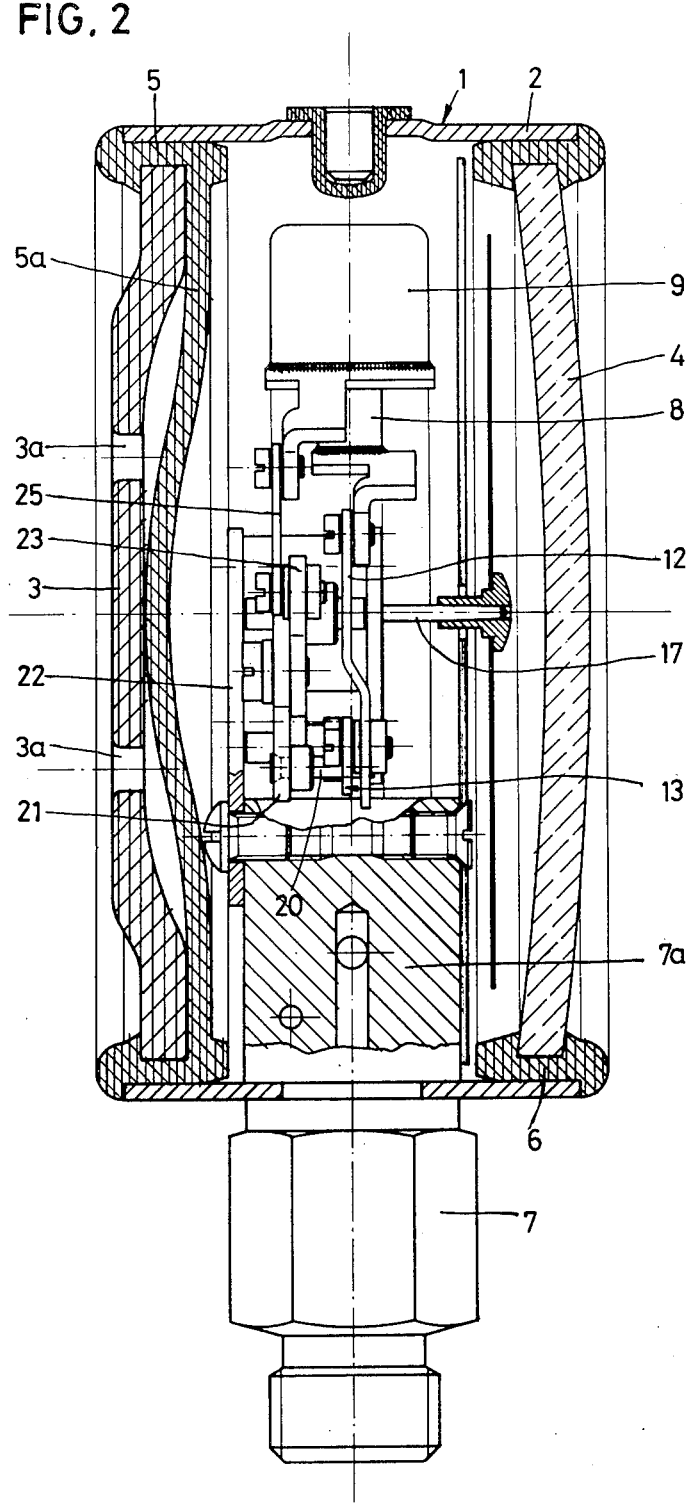
FIG. 2 is a partial section taken on the line II—II of FIG. 1.

In both of the embodiments to be described, the gauge takes the form of diving-time gauge for indicating the remaining diving time available to a diver at a given moment based upon his gas supply and his diving depth at that moment.

In the first embodiment, a case 1 is limited around its outside middle part by a cylindrical wall portion 2 and is closed off at the back by a cover 3 and at the front by a window shield 4. The cover 3 and the window shield 4 are set into the wall portion 2 with the aid of corresponding sealing members 5 and 6. The annular sealing member 5 comprises a membrane 5a which, by means of apertures 3a in the cover 3, is exposed to the ambient pressure, i.e. when in use, to the water pressure, which it transmits to the interior of the case. The case 1 has an outwardly-projecting connecting piece 7 for an oxygen source (not shown). Within an interior portion 7a of the connecting piece 7, one end each of two measuring elements 8 and 9, in the form of Bourdon tubes, are fastened. One of these Boudon tubes (first measuring element) communicates with an oxygen pipe 10, while the other 9 (second measuring element) is evacuated. Reference numeral 11 designates the evacuation connecting piece. The result is that the first measuring element 8 is exposed both to the oxygen pressure and to the water pressure, so that the movement of its free end corresponds to the respective pressure differential, while the second measuring element 9 is influenced solely by the water pressure.

The free end of the first measuring element 8 is linked to a transmission lever 12 which is linked in turn to one arm 13a of a two-armed control lever 13. The other arm 13b is linked to a pointer-lever 16 which is pivotable around a pivot stud 14 and which carries a toothed segment 15. The toothed segment 15 meshes with a pinion 18 seated on a pointer spindle 17. The control lever 13 has an elongated, arcuate slot 19 into which a stud 20, representing the fulcrum of this lever, enters. The stud 20 is seated on an arm 21, in the form of a correcting lever, of a two-part bent lever 21/23 pivotably mounted on a base plate 22 of the case 1. The two parts 21 and 23 of the bent lever are connected to each other, adjustably and lockably in their mutual positions, by a screw 24. The point of intersection of the geometrical axis of a stud 26 with the plane of the control lever 13 forms the center of the circle along the arc of which the slot 19 runs. The other part 23 of the two-part lever is connected to the free end of the second measuring element 9 via a guide rod 25. This means that upon a movement of the free end of the second measuring element 9, the fulcrum 20 of the two-armed control lever 13 is displaced within the slot 19, whereby the extent of a pointer deflection caused by a movement of the free end of the first measuring element 8 via the levers 12, 13, and 16 is influenced in its magnitude for the purpose of adhering to the formula C·(P/Q).

Figure 3:
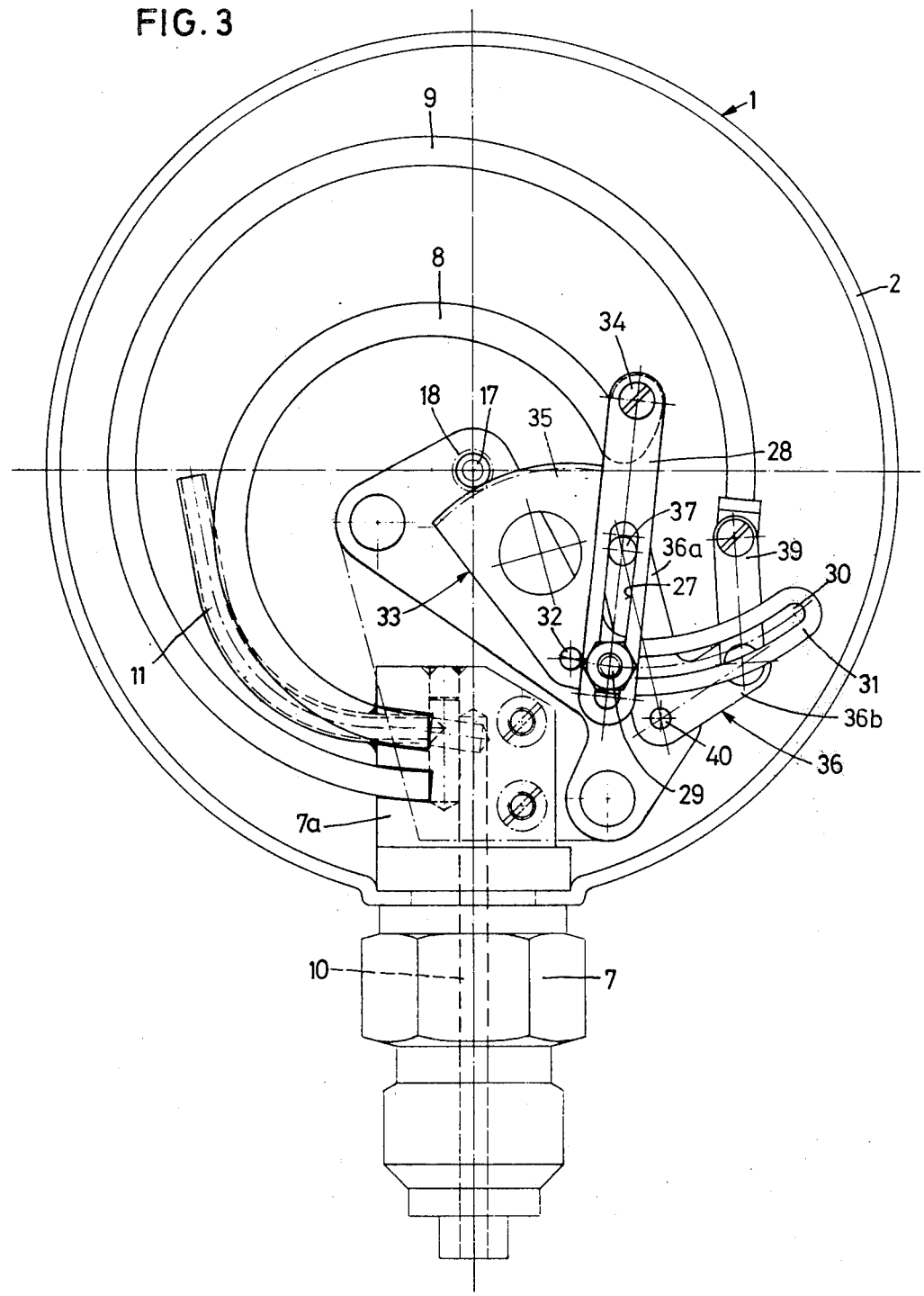
FIG. 3 illustrates a second embodiment viewed in the same manner as in FIG. 1.

In the second embodiment according to FIG. 3, the construction of the case 1 and the attachment of the two measuring elements 8 and 9 are the same as described in connection with the first embodiment. In contrast to the first embodiment, however, the free end of the first measuring element is linked at a point designated as 34 to a one-armed rocking lever 28 having an elongated slot 27. The slot 27 is penetrated by a control stud 29 which, in turn, passes through an arcuate slot 30 in one arm 31, taking the form of a control lever, of a two-armed operating sector 33 pivotable around a spindle 32. The sector 33 is provided along the periphery of its other arm 35 with a toothing which meshes with the pinion 18 seated on the pointer spindle 17. The center of the circle of which the slot 30 is an arc is then situated at the pivotal point 34. A carrier bolt 37 seated on one arm 36a of a two-armed adjustable lever 36 enters the slot 27 of the one-armed lever 28, and the other arm 36b is connected to the free end of the second measuring element 9 via a guide rod 39.

The transmission of motion of the free ends of the measuring elements 8 and 9 takes place primarily by means of the first measuring element 8, with this motion being transmitted via the rocking lever 28 to the slotted arm 31, taking the form of a control lever, of the operating sector 33, so that the latter swivels about its spindle 32 to a corresponding extent and thereby sets the pointer spindle 17 in rotation. The extent of this motion ultimately transmitted to the pointer spindle is now influenced by the second measuring element 9 in that, upon a movement of the free end of this second measuring element 9, the adjustable lever 36 is swivelled about its center of rotation 40 so that the rocking lever 28 is swivelled in turn by the carrier stud 37 in such a way as to change the distance between the control stud 29 and the pivotal point 32, which distance is decisive with respect to the deflection of the pointer. In this way, too, it is made possible, when the various parts of the lever mechanism are properly dimensioned and their mutual positions suitably adjusted, to impart to the pointer a motion corresponding to the value C·(P/Q), in which, in the design as a diving-time gauge described here, P represents the differential pressure between the gas or oxygen pressure and the water pressure, and Q represents the water pressure plus 1.

We claim:

1. A diving-time gauge for indicating the remaining diving-time available to a diver at a given moment based upon his gas supply and his diving depth at that moment adhering to the formula C·(P/Q), with C being a constant, P being the differential pressure between the gas pressure and the water pressure, and Q being the water pressure plus 1, comprising a first measuring element exposed to the pressure differential P and a second measuring element exposed to the water pressure plus 1 Q, each measuring element having one end and a free end, each element being fastened at said one end, the free ends each being adapted to carryout movements corresponding to the variations of P and Q, respectively, a pointer mechanism to which movements are transmitted in a combination such that the turning of the pointer mechanism corresponds to the formula C·(P/Q), and a lever mechanism including a control lever, in which the two measuring elements are each fastened at said one end separately from one another, and the free end of the first measuring element is connected to the pointer mechanism via said lever mechanism, with a swivelling of the control lever corresponding to a certain movement of the free end of the first measuring element being influenced in its magnetude by the second measuring element.

2. The diving-time gauge according to claim 1, wherein the control lever is a two-armed lever having a displaceable fulcrum, the free end of the first measuring element being linked to the control lever, and the free end of the second measuring element being connected to a correcting lever bearing a pivot for the control lever.

3. The diving-time gauge according to claim 1, wherein a one-armed rocking lever is linked to the free end of the first measuring element, with the control lever taking the form of one arm of a two-armed operating sector and cooperating with the free end of the said rocking lever, and wherein the free end of the second measuring element is connected to an pivotal point of the said rocking lever on the control lever is varied.

4. The diving-time gauge according to claim 1, wherein the first and second measuring elements are each a Bourdon tube.

* * * * *